US010763988B2

(12) United States Patent
Wu et al.

(10) Patent No.: US 10,763,988 B2
(45) Date of Patent: Sep. 1, 2020

(54) CHANNEL BONDING IN MULTIPLE-WAVELENGTH PASSIVE OPTICAL NETWORKS (PONS)

(71) Applicant: Futurewei Technologies, Inc., Plano, TX (US)

(72) Inventors: Xuming Wu, Wuhan (CN); Yuanqiu Luo, Cranbury, NJ (US); Jianhe Gao, Wuhan (CN)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 16/192,698

(22) Filed: Nov. 15, 2018

(65) Prior Publication Data

US 2019/0089477 A1    Mar. 21, 2019

Related U.S. Application Data

(63) Continuation of application No. 15/493,824, filed on Apr. 21, 2017, now abandoned.
(Continued)

(51) Int. Cl.
*H04J 14/02* (2006.01)
*H04L 12/927* (2013.01)
(Continued)

(52) U.S. Cl.
CPC ...... *H04J 14/0258* (2013.01); *H04J 14/0232* (2013.01); *H04J 14/0235* (2013.01);
(Continued)

(58) Field of Classification Search
CPC ............... H04J 14/0258; H04J 14/0235; H04J 14/0232; H04J 14/0223; H04L 47/6255; H04L 47/6275
(Continued)

(56) References Cited

U.S. PATENT DOCUMENTS

| 6,411,410 B1 | 6/2002 | Wright et al. |
| 2005/0153744 A1* | 7/2005 | Desai .................. H04W 4/16 455/560 |

(Continued)

FOREIGN PATENT DOCUMENTS

| CN | 101039147 A | 9/2007 |
| CN | 101827289 A | 9/2010 |

(Continued)

OTHER PUBLICATIONS

Hajduczenia, "Discovery process for emerging 10 Gb/s EPONs" IEEE Communications Magazine, vol. 46, Issue: 11, Nov. 2008.*
(Continued)

*Primary Examiner* — Juan A Torres
(74) *Attorney, Agent, or Firm* — Gregg L. Jansen

(57) ABSTRACT

An apparatus comprises: a processor configured to: select a first channel from among a plurality of channels in a network, and generate a first message assigning a first grant corresponding to the first channel; a transmitter coupled to the processor and configured to transmit the first message; and a receiver coupled to the processor and configured to receive a second message on the first channel and in response to the first message. A method comprises: selecting a first channel from among a plurality of channels in a network; generating a first message assigning a first grant corresponding to the first channel; transmitting the first message; and receiving a second message on the first channel in response to the first message.

23 Claims, 12 Drawing Sheets

Related U.S. Application Data

(60) Provisional application No. 62/329,011, filed on Apr. 28, 2016.

(51) Int. Cl.
*H04L 12/863* (2013.01)
*H04L 12/865* (2013.01)

(52) U.S. Cl.
CPC ...... *H04J 14/0252* (2013.01); *H04L 47/6255* (2013.01); *H04L 47/805* (2013.01); *H04J 14/0223* (2013.01); *H04L 47/6275* (2013.01)

(58) Field of Classification Search
USPC .......................................................... 398/67
See application file for complete search history.

(56) References Cited

U.S. PATENT DOCUMENTS

| | | | |
|---|---|---|---|
| 2005/0202791 A1* | 9/2005 | Krause | H04W 36/0066 455/127.4 |
| 2006/0222365 A1 | 10/2006 | Jung et al. | |
| 2006/0268704 A1 | 11/2006 | Ansari et al. | |
| 2007/0092256 A1 | 4/2007 | Nozue et al. | |
| 2009/0175622 A1 | 7/2009 | Lee et al. | |
| 2009/0202245 A1 | 8/2009 | Bouda | |
| 2012/0008937 A1* | 1/2012 | Cheng | H04B 10/671 398/1 |
| 2012/0177361 A1 | 7/2012 | Hirano et al. | |
| 2012/0327818 A1* | 12/2012 | Takatori | H04L 5/14 370/277 |
| 2013/0045005 A1* | 2/2013 | Nakura | H04B 10/272 398/25 |
| 2013/0089325 A1 | 4/2013 | Sarashina et al. | |
| 2013/0094861 A1* | 4/2013 | Luo | H04J 14/0278 14/278 |
| 2013/0094862 A1 | 4/2013 | Luo et al. | |
| 2013/0195036 A1* | 8/2013 | Quan | H04W 72/04 370/329 |
| 2013/0343761 A1* | 12/2013 | Fang | H04Q 11/0067 398/115 |
| 2014/0099105 A1* | 4/2014 | Yan | H04B 10/0799 398/38 |
| 2014/0186041 A1* | 7/2014 | Shellhammer | H04Q 11/0071 398/79 |
| 2014/0369676 A1 | 12/2014 | Hamaoka | |
| 2015/0365172 A1 | 12/2015 | Luo et al. | |
| 2017/0048857 A1* | 2/2017 | Vajapeyam | H04W 72/1284 |
| 2017/0094683 A1* | 3/2017 | Sun | H04L 27/0006 |

FOREIGN PATENT DOCUMENTS

| | | |
|---|---|---|
| CN | 102045610 A | 5/2011 |
| CN | 103444111 A | 12/2013 |
| CN | 104205739 A | 12/2014 |
| JP | 2011147023 A | 7/2011 |
| JP | 2013085037 A | 5/2013 |

OTHER PUBLICATIONS

IEEE Standard for Ethernet Section Five. IEEE Standard. 802.3-2012. Section 5, 2012. total 844 pages.
Glen Kramer et al. A proposal to decouple connectivity from media access, Aug. 2016. total 18 pages.

\* cited by examiner

400

| | |
|---|---|
| 405 | Destination Address |
| 410 | Source Address |
| 415 | Length/Type = 0x8808 |
| 420 | Opcode = 0x0002 |
| 425 | Timestamp |
| 430 | Channel Assignment |
| 435 | Number of Grants/Flags |
| 440 | Grant #1 Start Time |
| 445 | Grant #1 Length |
| 450 | Sync Time |
| 455 | Discovery Information |
| 460 | Channel Information |
| 465 | Pad/Reserved |
| 470 | FCS |

| Bit | Channel Flag | Values |
|---|---|---|
| 0 | Channel 0 | 0 – Channel 0 is not for discovery; 1 – Channel 0 is for discovery |
| 1 | Channel 1 | 0 – Channel 1 is not for discovery; 1 – Channel 1 is for discovery |
| 2 | Channel 2 | 0 – Channel 2 is not for discovery; 1 – Channel 2 is for discovery |
| 3 | Channel 3 | 0 – Channel 3 is not for discovery; 1 – Channel 3 is for discovery |
| 4-7 | Reserved | Ignored on Reception |

600

| 605 | Destination Address |
| --- | --- |
| 610 | Source Address |
| 615 | Length/Type = 0x8808 |
| 620 | Opcode = 0x0002 |
| 625 | Timestamp |
| 630 | Channel Assignment |
| 635 | Number of Grants/Flags |
| 640 | Grant #1 Start Time |
| 645 | Grant #1 Length |
| 650 | Grant #2 Start Time |
| 655 | Grant #2 Length |
| 660 | Grant #3 Start Time |
| 665 | Grant #3 Length |
| 670 | Grant #4 Start Time |
| 675 | Grant #4 Length |
| 680 | Pad/Reserved |
| 685 | FCS |

| Bit | Channel Flag | Values |
|---|---|---|
| 0 | Channel 0 | 0 – Grant is not for channel 0; 1 – Grant is for channel 0 |
| 1 | Channel 1 | 0 – Grant is not for channel 1; 1 – Grant is not for channel 1 |
| 2 | Channel 2 | 0 – Grant is not for channel 2; 1 – Grant is not for channel 2 |
| 3 | Channel 3 | 0 – Grant is not for channel 3; 1 – Grant is not for channel 3 |
| 4-7 | Reserved | Ignored on Reception |

| | |
|---|---|
| 905 — | Destination Address |
| 910 — | Source Address |
| 915 — | Length/Type = 0x8808 |
| 920 — | Opcode = 0x0003 |
| 925 — | Timestamp |
| 930 — | Number of Queue Sets |
| 935 — | Channel Assignment |
| 940 — | Report Bitmap |
| 945 — | Queue #0 Report |
| 950 — | Queue #1 Report |
| 955 — | Queue #2 Report |
| 960 — | Queue #3 Report |
| 965 — | Queue #4 Report |
| 970 — | Queue #5 Report |
| 975 — | Queue #6 Report |
| 980 — | Queue #7 Report |
| 985 — | Pad/Reserved |
| 990 — | FCS |

935

| Bit | Channel Flag | Values |
|---|---|---|
| 0 | Channel 0 | 0 – Report is not for channel 0; 1 – Report is for channel 0 |
| 1 | Channel 1 | 0 – Report is not for channel 1; 1 – Report is not for channel 1 |
| 2 | Channel 2 | 0 – Report is not for channel 2; 1 – Report is not for channel 2 |
| 3 | Channel 3 | 0 – Report is not for channel 3; 1 – Report is not for channel 3 |
| 4-7 | Reserved | Ignored on Reception |

US 10,763,988 B2

CHANNEL BONDING IN MULTIPLE-WAVELENGTH PASSIVE OPTICAL NETWORKS (PONS)

CROSS-REFERENCE TO RELATED APPLICATIONS

This application claims priority to and benefit of U.S. non-provisional patent application Ser. No. 15/493,824 filed on Apr. 21, 2017 by Futurewei Technologies, Inc. and titled "Channel Bonding in Multiple-Wavelength Passive Optical Networks (PONs)," which in turn claims priority to and benefit of U.S. provisional patent application No. 62/329,011 filed on Apr. 28, 2016 by Futurewei Technologies, Inc. and titled "Granting Mechanisms For Multi-Lane Passive Optical Networks (PONs)," which applications are hereby incorporated by reference.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A PON is one system for providing network access over the last mile, which is the final portion of a telecommunications network that delivers communication to customers. A PON is a P2MP network comprising an OLT at a CO, ONUs at the user premises, and an ODN coupling the OLT to the ONUs. PONs may also comprise RNs located between the OLTs and the ONUs, for instance at the end of roads where multiple customers reside.

NG-PONs may combine TDM and WDM to support higher capacities so that increased numbers of users can be served by a single OLT with sufficient bandwidth per user. In such a TWDM PON, a WDM PON may be overlaid on top of a TDM PON. In other words, different wavelengths may be multiplexed together to share a single feeder fiber, and each wavelength may be shared by multiple users using TDM.

SUMMARY

In one embodiment, the disclosure includes an apparatus comprising: a processor configured to: select a first channel from among a plurality of channels in a network, and generate a first message assigning a first grant corresponding to the first channel; a transmitter coupled to the processor and configured to transmit the first message; and a receiver coupled to the processor and configured to receive a second message on the first channel in response to the first message. In some embodiments, wherein the first message is a discovery gate message comprising a channel assignment field, a grant start time field, and a channel information field, wherein the channel assignment field indicates the first channel for upstream transmission, wherein the grant start time field indicates when to transmit on the first channel, and wherein the channel information field indicates channel-related information; the channel-related information is at least one of a channel rate, a channel association, or a channel priority; the first message is a gate message comprising a channel assignment field and a grant start time field, wherein the channel assignment field indicates the first channel for upstream transmission, and wherein the grant start time field indicates when to transmit on the first channel; the second message is a report message comprising a channel assignment field and a queue report field, wherein the channel assignment field indicates the first channel, and wherein the queue report field indicates a queue report for the first channel; the processor is further configured to select a second channel from among the channels, and wherein the first message further assigns a second grant corresponding to the second channel; the transmitter is further configured to transmit the first message on the first channel; the transmitter is further configured to transmit the first message on a second channel from among the channels; the apparatus is an OLT, and wherein the network is a PON; the transmitter is further configured to further transmit the first message to an ONU comprising a plurality of ONU transmitters, wherein the ONU transmitters comprise a first transmitter corresponding to the first channel, and wherein the first message instructs the ONU to disable all of the ONU transmitters except for the first transmitter.

In another embodiment, the disclosure includes a method comprising: selecting a first channel from among a plurality of channels in a network; generating a first message assigning a first grant corresponding to the first channel; transmitting the first message; and receiving a second message on the first channel and in response to the first message. In some embodiments, the first message is a discovery gate message comprising a channel assignment field, a grant start time field, and a channel information field, wherein the channel assignment field indicates the first channel for upstream transmission, wherein the grant start time field indicates when to transmit on the first channel, and wherein the channel information field indicates channel-related information; the first message is a gate message comprising a channel assignment field and a grant start time field, wherein the channel assignment field indicates the first channel for upstream transmission, and wherein the grant start time field indicates when to transmit on the first channel; the second message is a report message comprising a channel assignment field and a queue report field, wherein the channel assignment field indicates the first channel, and wherein the queue report field indicates a queue report for the first channel; the method further comprises selecting a second channel from among the channels, wherein the first message further assigns a second grant corresponding to the second channel; an OLT implements the method, wherein the network is a PON, wherein the transmitting comprises transmitting the first message to an ONU comprising a plurality of ONU transmitters, wherein the ONU transmitters comprise a first transmitter corresponding to the first channel, and wherein the first message instructs the ONU to disable all of the ONU transmitters except for the first transmitter.

In yet another embodiment, the disclosure includes an ONU comprising: a receiver configured to receive a first message assigning a first grant corresponding to a first channel selected from among a plurality of channels; a processor coupled to the receiver and configured to: process the first message, and generate a second message; and a transmitter coupled to the processor and configured to transmit the second message on the first channel and according to the first grant. In some embodiments, the first message further assigns a second grant corresponding to a second channel selected from among the channels, wherein the processor is further configured to generate a third message, and wherein the transmitter is further configured to transmit the third message on the second channel and according to the second grant; the first message is a gate message comprising a channel assignment field and a grant start time field, wherein the channel assignment field indicates the first channel for upstream transmission, and wherein the grant start time field indicates when to transmit on the first channel; the second message is a report message comprising a channel assignment field and a queue report field, wherein the channel assignment field indicates the first channel, and wherein the queue report field indicates a queue report for the first channel.

Any of the above embodiments may be combined with any of the other above embodiments to create a new embodiment. These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 4 is an extended discovery gate message according to an embodiment of the disclosure.

FIG. 6 is an extended gate message according to an embodiment of the disclosure.

DETAILED DESCRIPTION

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The following abbreviations and initialisms apply:
ASIC: application-specific integrated circuit
CO: central office
CPU: central processing unit
DSP: digital signal processor
EO: electrical-to-optical
EPON: Ethernet PON
FCS: frame check sequence
G, Gb/s: gigabit(s) per second
ID: identifier
IEEE: Institute of Electrical and Electronics Engineers
LLID: logical link ID
MPCP: Multi-Point Control Protocol
NG-PON: next-generation PON
ODN: optical distribution network
OE: optical-to-electrical
OLT: optical line terminal
ONT: optical network terminal
ONU: optical network unit
opcode: operation code
PON: passive optical network
P2MP: point-to-multipoint
RAM: random-access memory
RN: remote node
ROM: read-only memory
RX: receiver unit
SRAM: static RAM
sync: synchronization
TCAM: ternary content-addressable memory
TDM: time-division multiplexing
TWDM: time- and wavelength-division multiplexing
TX: transmitter unit
WDM: wavelength-division multiplexing.

Figure 1:
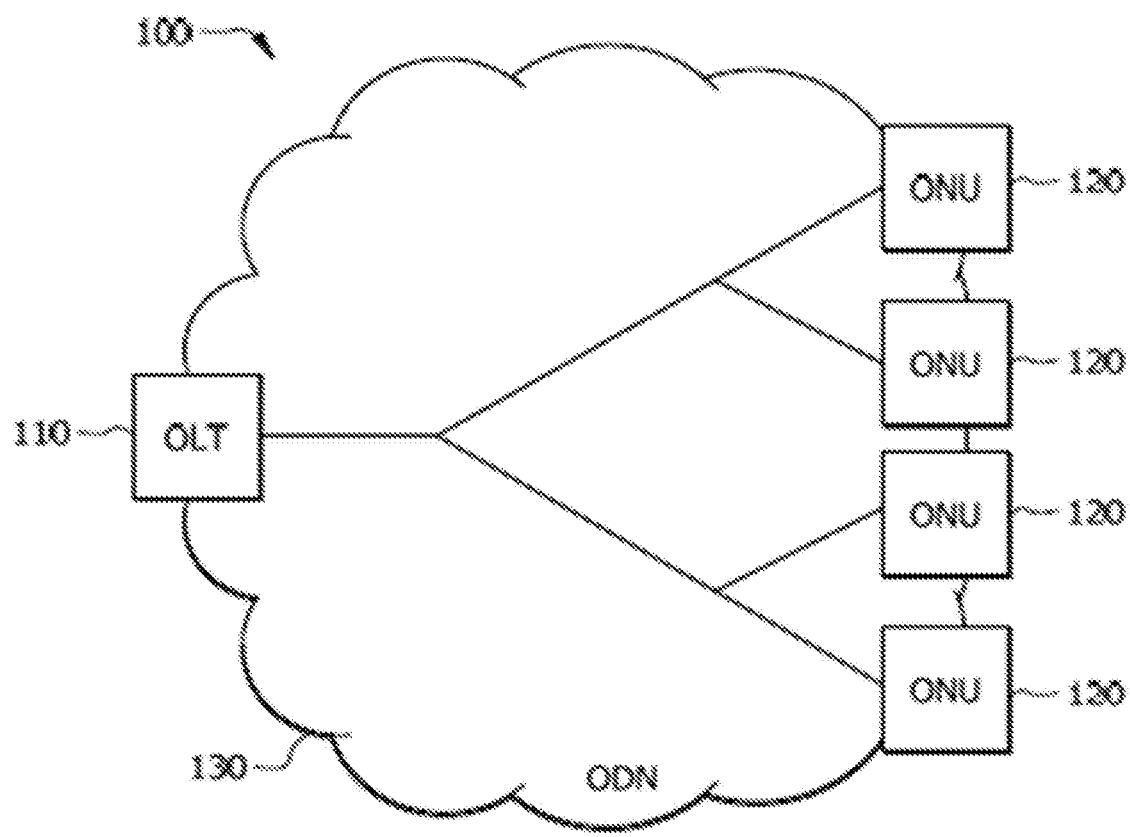
FIG. 1 is a schematic diagram of a PON.

FIG. 1 is a schematic diagram of a PON 100. The PON 100 comprises an OLT 110, a plurality of ONUs 120, and an ODN 130 that couples the OLT 110 to the ONUs 120. The PON 100 is a communications network that may not require active components to distribute data between the OLT 110 and the ONUs 120. Instead, the PON 100 may use passive optical components in the ODN 130 to distribute data between the OLT 110 and the ONUs 120.

The OLT 110 communicates with the ONUs 120 and another network. Specifically, the OLT 110 is an intermediary between the other network and the ONUs 120. For instance, the OLT 110 forwards data received from the other network to the ONUs 120 and forwards data received from the ONUs 120 to the other network. The OLT 110 comprises a transmitter and a receiver. When the other network uses a network protocol that is different from the protocol used in the PON 100, the OLT 110 comprises a converter that converts the network protocol to the PON protocol and vice versa. The OLT 110 is typically located at a central location such as a CO, but it may also be located at other suitable locations.

The ODN 130 is a data distribution system that comprises optical fiber cables, couplers, splitters, distributors, and other suitable components. The components include passive optical components that do not require power to distribute signals between the OLT 110 and the ONUs 120. Alternatively, the components include active components such as optical amplifiers that do require power. The ODN 130 extends from the OLT 110 to the ONUs 120 in a branching configuration as shown, but the ODN 130 may be configured in any other suitable P2MP configuration.

The ONUs 120 communicate with the OLT 110 and customers and act as intermediaries between the OLT 110 and the customers. For instance, the ONUs 120 forward data from the OLT 110 to the customers and forward data from the customers to the OLT 110. The ONUs 120 comprise optical transmitters that convert electrical signals into optical signals and transmit the optical signals to the OLT 110, and the ONUs 120 comprise optical receivers that receive optical signals from the OLT 110 and convert the optical signals into electrical signals. The ONUs 120 further comprise second transmitters that transmit the electrical signals to the customers and second receivers that receive electrical signals from the customers. ONUs 120 and ONTs are similar, and the terms may be used interchangeably. The ONUs 120 are typically located at distributed locations such as customer premises, but they may also be located at other suitable locations.

IEEE P802.3ca 100 G-EPON Task Force is tasked with defining physical layer specifications and management parameters for 25 G, 50 G, and 100 G multiple-wavelength PONs. Such PONs support channel bonding, which refers to the OLT 110 assigning multiple channels to an ONU 120 to use at the same time and refers to an ONU 120 using multiple channels at the same time. The ONU 120 may perform channel-bonded reception in a downstream direction from the OLT 110 to the ONU 120, or channel-bonded transmission in an upstream direction from the ONU 120 to the OLT 110. For a 100 G-EPON, each channel, or lane, corresponds to a different wavelength and provides up to a 25 G data rate. Thus, an ONU 120 transmits and receives using one channel to achieve a 25 G data rate, the ONU 120 transmits and receives using two channels to achieve a 50 G data rate, the ONU 120 transmits and receives using three channels to achieve a 75 G data rate, and the ONU 120 transmits and receives using four channels to achieve a 100 G data rate.

Figure 2:
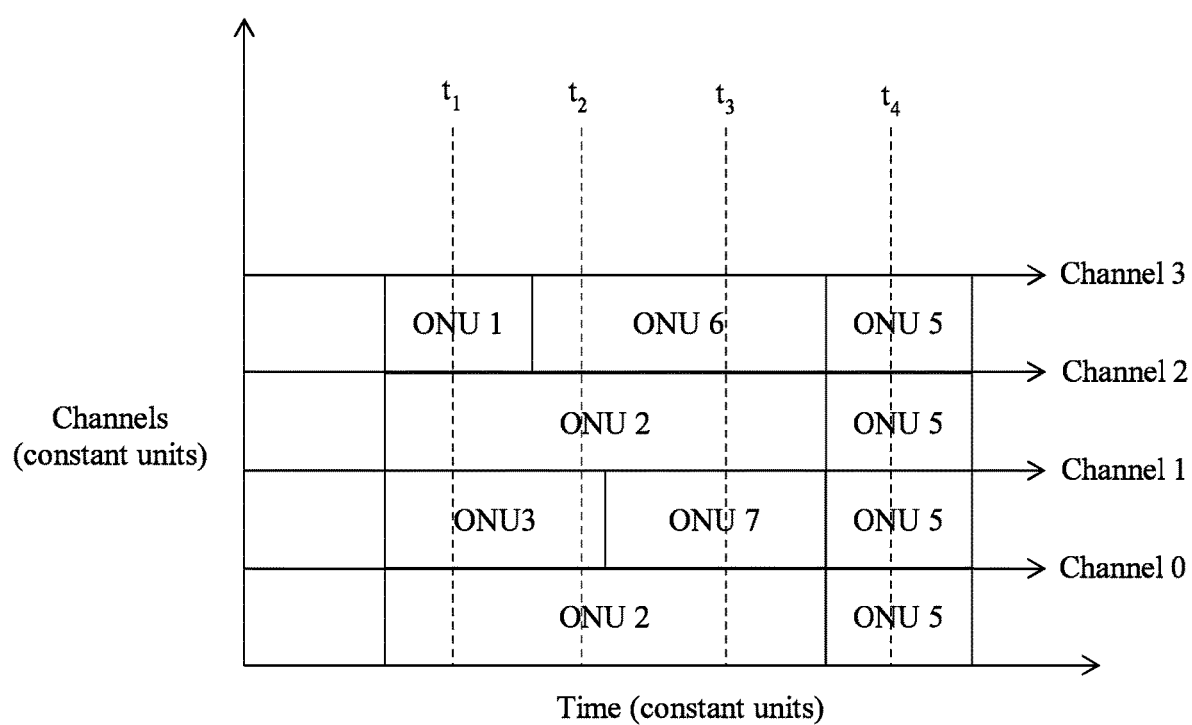
FIG. 2 is a graph demonstrating an upstream channel bonding scheme.

FIG. 2 is a graph 200 demonstrating an upstream channel bonding scheme. The x-axis represents time in constant units, and the y-axis represents channels in constant units. The PON 100 employs the upstream channel bonding scheme. In this case, the PON 100 comprises seven ONUs 120 denoted as ONU 1-ONU 7. The upstream channel bonding scheme uses channels 0-3 corresponding to wavelengths $\lambda_0$-$\lambda_4$. Each channel provides a 25 G data rate. At time $t_1$, ONU 1 transmits using channel 3, ONU 2 transmits using both channel 0 and channel 2, and ONU 3 transmits using channel 1. At time $t_2$, ONU 2 transmits using both channel 0 and channel 2, ONU 3 transmits using channel 1, and ONU 6 transmits using channel 3. At time $t_3$, ONU 2 transmits using both channel 0 and channel 2, ONU 6 transmits using channel 3, and ONU 7 transmits using channel 1. At time $t_4$, ONU 5 transmits using channels 0-3. However, there remains a need to implement channel bonding in the upstream direction.

Disclosed herein are embodiments for channel bonding in multiple-wavelength PONs. The disclosed embodiments extend IEEE MPCP messages to implement upstream channel bonding. A discovery gate message is extended to include a channel assignment field, or lane flag field, for the OLT 110 to grant upstream channels to the ONUs 120 for discovery. A gate message is extended to include a channel assignment field for the OLT 110 to grant upstream channels to the ONUs 120 for normal operation. In this context, normal operation refers to operation other than during discovery. For instance, normal operation comprises communication of user data that is to be communicated beyond the PON 100 and to a larger network. A report message is extended to include a channel assignment field for the ONUs 120 to report queue statuses of channels to the OLT 110. Though specific numbers of channels are discussed, the disclosed embodiments apply to any suitable number of channels. In addition, though channels are discussed as being associated with wavelengths, channels may be associated with other concepts. Furthermore, though upstream channel bonding is discussed, the same principles apply to downstream channel bonding. Finally, though extended IEEE MPCP messages are discussed, the same principles apply to other types of extended messages or new messages.

Figure 3:
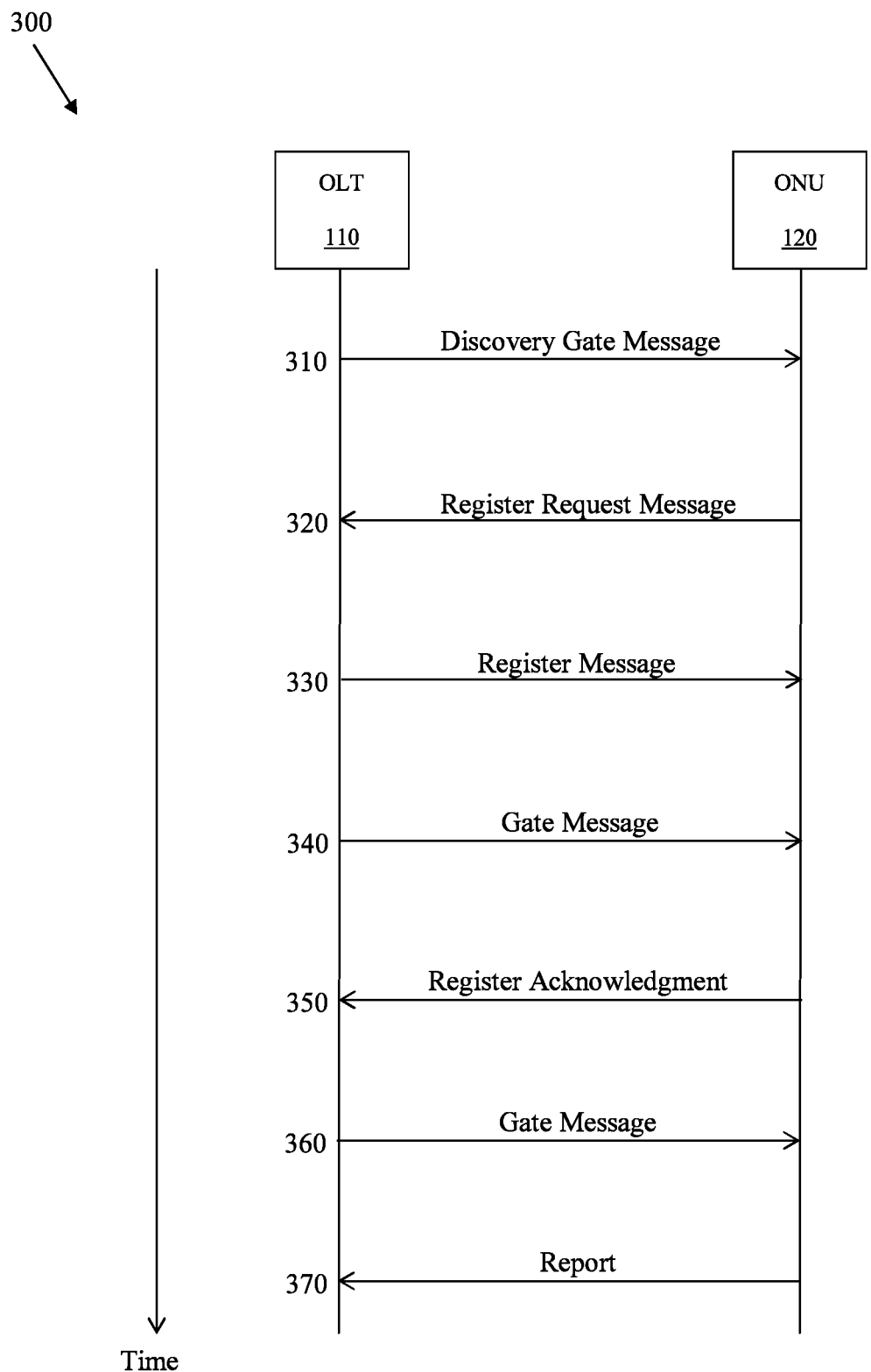
FIG. 3 is a message sequence diagram illustrating registration and reporting of an ONU.

FIG. 3 is a message sequence diagram 300 illustrating registration and reporting of an ONU 120. At step 310, the OLT 110 transmits to the ONUs 120 a discovery gate message granting transmission windows for discovery. At step 320, an ONU 120 transmits to the OLT 110 a register request message requesting registration in the PON 100 and indicating capabilities of the ONU 120. At step 330, the OLT 110 transmits to the ONU 120 a register message instructing the ONU 120 to register and assigning IDs to the ONU 120. At step 340, the OLT 110 transmits to the ONU 120 a gate message to grant transmission windows for the ONU 120 to transmit a register acknowledgment message.

At step 350, the ONU 120 transmits to the OLT 110 a register acknowledgment message acknowledging the register message and echoing the IDs. By completing step 350, the ONU 120 completes registration and enters normal operation. At step 360, the OLT 110 transmits to the ONU 120 a gate message instructing the ONU 120 to grant transmission windows for normal transmission. Finally, at step 370, the ONU 120 transmits to the OLT 110 a report message indicating queue statuses. The messages are described in IEEE 802.3-2012, Section 5, 2012 ("802.3-2012"), which is incorporated by reference. The discovery gate message at step 310; the gate message at steps 340, 360; and the report message at step 370 are extended as described further below.

FIG. 4 is an extended discovery gate message 400 according to an embodiment of the disclosure. The extended discovery gate message 400 implements the discovery gate message in step 310 in FIG. 3. The OLT 110 transmits the extended discovery gate message 400 to the ONU 120 to grant transmission windows in multiple channels for discovery. The extended discovery gate message 400 comprises a destination address field 405, a source address field 410, a length/type field 415, an opcode field 420, a timestamp field 425, a channel assignment field 430, a number of grants/flags field 435, a grant #1 start time field 440, a grant #1 length field 445, a sync time field 450, a discovery information field 455, a channel information field 460, a pad/reserved field 465, and an FCS field 470.

The channel assignment field 430 may be a bitmap and indicates a channel, for instance channel 1 corresponding to wavelength $\lambda_1$, for the ONU 120 to transmit on during discovery. The channel assignment field 430 is described further below. The grant #1 start time field 440 indicates when the ONU 120 can transmit a first signal on the channel indicated in the channel assignment field 430, and the grant #1 length field 445 indicates how long the ONU 120 can transmit the first signal on the channel indicated in the channel assignment field 430. The channel information field 460 indicates channel-related information of the channel indicated in the channel assignment field 430. The channel-related information is a channel rate, a channel association, a channel priority, or other suitable information.

The OLT 110 may transmit the extended discovery gate message 400 to the ONU 120 whether or not the ONU 120 is capable of channel bonding. If the OLT 110 determines that it should assign multiple channels to the ONU 120 for discovery, then the channel assignment field 430 indicates multiple channels. Alternatively, if the OLT 110 determines that it should assign multiple channels to the ONU 120 for discovery, then the channel assignment field 430 indicates one channel and the OLT 110 transmits the extended discovery gate message 400 to the ONU 120 for each channel.

Figure 5:
FIG. 5 is the channel assignment field in FIG. 4.

FIG. 5 is the channel assignment field 430 in FIG. 4. The channel assignment field 430 comprises bit 0 corresponding to channel 0, bit 1 corresponding to channel 1, bit 2 corresponding to channel 2, bit 3 corresponding to channel 3, and bits 4-7 that are reserved. For each of bits 0-3, a binary 0 indicates that the corresponding channel is not for discovery and a binary 1 indicates that the corresponding channel is for discovery. Bits 4-7 may be padded with 0s or 1s. For example, when bits 0-7 are equal to 00000100, channels 0-1 and 3 are not for discovery and channel 2 is for discovery.

FIG. 6 is an extended gate message 600 according to an embodiment of the disclosure. The extended gate message 600 implements the gate message in steps 340, 360 in FIG. 3. The OLT 110 transmits the extended gate message 600 to the ONU 120 to grant transmission windows in multiple channels for normal operation. The extended gate message 600 comprises a destination address field 605, a source address field 610, a length/type field 615, an opcode field 620, a timestamp field 625, a channel assignment field 630, a number of grants/flags field 635, a grant #1 start time field 640, a grant #1 length field 645, a grant #2 start time field 650, a grant #2 length field 655, a grant #3 start time field 660, a grant #3 length field 665, a grant #4 start time field 670, a grant #4 length field 675, a pad/reserved field 680, and an FCS field 685.

The channel assignment field 630 may be a bitmap and indicates a channel, for instance channel 1 corresponding to wavelength $\lambda_1$, for the ONU 120 to transmit on during normal operation. The channel assignment field 630 is described further below. The grant #1 start time field 640 indicates when the ONU 120 can transmit a first signal on the channel indicated in the channel assignment field 630, and the grant #1 length field 645 indicates how long the ONU 120 can transmit the first signal on the channel indicated in the channel assignment field 630. The grant #2 start time field 650 and the grant #2 length field 655 are similar for a second signal, the grant #3 start time field 660 and the grant #3 length field 665 are similar for a third signal, and the grant #4 start time field 670 and the grant #4 length field 675 are similar for a fourth signal.

The OLT 110 may transmit the extended gate message 600 to the ONU 120 whether or not the ONU 120 is capable of channel bonding. If the OLT 110 determines that it should assign multiple channels to the ONU 120 for normal operation, then the channel assignment field 630 indicates multiple channels. Alternatively, if the OLT 110 determines that it should assign multiple channels to the ONU 120 for normal operation, then the channel assignment field 630 indicates one channel and the OLT 110 transmits the extended gate message 600 to the ONU 120 for each channel.

Figure 7:
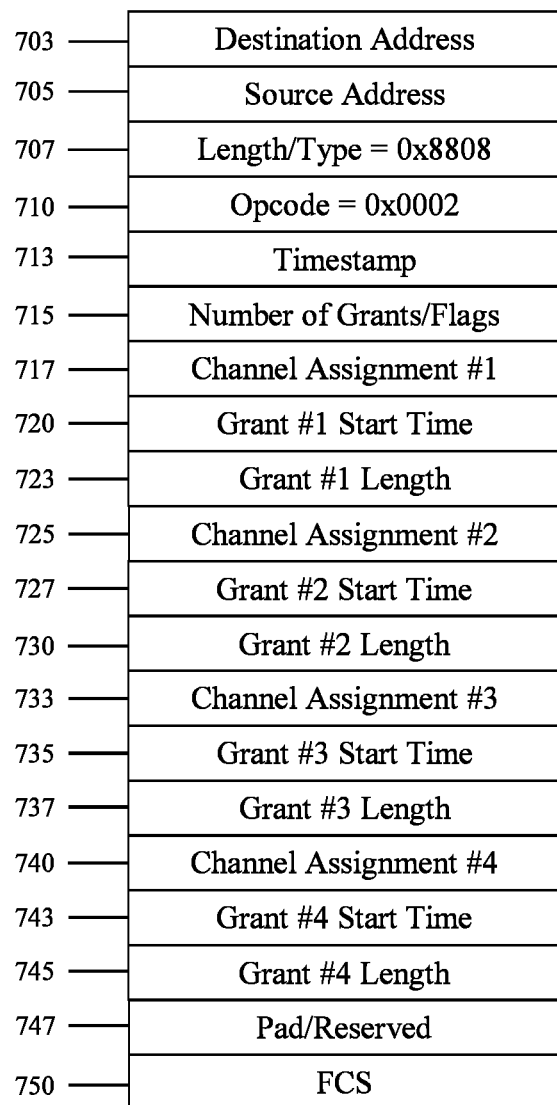
FIG. 7 is an extended gate message according to another embodiment of the disclosure.

FIG. 7 is an extended gate message 700 according to another embodiment of the disclosure. The extended gate message 700 is similar to the extended gate message 600 in FIG. 6. Specifically, the extended gate message 700 comprises a destination address field 703, a source address field 705, a length/type field 707, an opcode field 710, a timestamp field 713, a number of grants/flags field 715, a grant #1 start time field 720, a grant #1 length field 723, a grant #2 start time field 727, a grant #2 length field 730, a grant #3 start time field 735, a grant #3 length field 737, a grant #4 start time field 743, a grant #4 length field 745, a pad/reserved field 747, and an FCS field 750. However, unlike the extended gate message 600, the extended gate message 700 comprises a channel assignment field for each grant. Specifically, the extended gate message 700 comprises a channel assignment #1 field 717, a channel assignment #2 field 725, a channel assignment #3 field 733, and a channel assignment #4 field 740.

Figure 8:
FIG. 8 is a channel assignment field according to an embodiment of the disclosure.

FIG. 8 is a channel assignment field 800 according to an embodiment of the disclosure. The channel assignment field 800 implements the channel assignment field 630 in FIG. 6 and the channel assignment #1 field 717, the channel assignment #2 field 725, the channel assignment #3 field 733, and the channel assignment #4 field 740 in FIG. 7. The channel assignment field 800 comprises bit 0 corresponding to channel 0, bit 1 corresponding to channel 1, bit 2 corresponding to channel 2, bit 3 corresponding to channel 3, and bits 4-7 that are reserved. For each of bits 0-3, a binary 0 indicates that the succeeding grant is not for the corresponding channel and a binary 1 indicates that the succeeding grant is for the corresponding channel. Bits 4-7 may be padded with 0s or 1s. For example, when bits 0-7 are equal to 00000010, the grant is not for channels 0 and 2-3, but is for channel 1.

Figure 9:
FIG. 9 is an extended report message according to an embodiment of the disclosure.

FIG. 9 is an extended report message 900 according to an embodiment of the disclosure. The extended report message 900 implements the report message in step 370 in FIG. 3. The ONU 120 transmits the extended report message 900 to the OLT 110 to report queue statuses. The extended report message 900 comprises a destination address field 905, a source address field 910, a length/type field 915, an opcode field 920, a timestamp field 925, a number of queue sets field 930, a channel assignment field 935, a report bitmap field 940, a queue #0 report field 945, a queue #1 report field 950, a queue #2 report field 955, a queue #3 report field 960, a queue #4 report field 965, a queue #5 report field 970, a queue #6 report field 975, a queue #7 report field 980, a pad/reserved field 985, and an FCS field 990.

The channel assignment field 935 may be a bitmap and indicates a channel, for instance channel 1 corresponding to wavelength $\lambda_1$, for which the ONU 120 is reporting queue statuses. The channel assignment field 935 is described further below. The queue #0 report field 945, the queue #1 report field 950, the queue #2 report field 955, the queue #3 report field 960, the queue #4 report field 965, the queue #5 report field 970, the queue #6 report field 975, and the queue #7 report field 980 indicate successive queue reports for the channel indicated in the channel assignment field 935.

The ONU 120 may transmit the extended report message 900 to the OLT 110 whether or not the ONU 120 is capable of channel bonding. If the ONU 120 is using multiple channels, then the extended report message 900 comprises a set of a channel assignment field and a queue report field for each channel. Alternatively, if the ONU 120 is using multiple channels, then the channel assignment field 935 indicates one channel and the ONU 120 transmits the extended report message 900 to the OLT 110 for each channel.

Figure 10:
FIG. 10 is the channel assignment field in FIG. 9.

FIG. 10 is the channel assignment field 935 in FIG. 9. The channel assignment field 935 comprises bit 0 corresponding to channel 0, bit 1 corresponding to channel 1, bit 2 corresponding to channel 2, bit 3 corresponding to channel 3, and bits 4-7 that are reserved. For each of bits 0-3, a binary 0 indicates that the succeeding queue reports are not for the corresponding channel and a binary 1 indicates that the succeeding queue reports are for the corresponding channel. Bits 4-7 may be padded with 0s or 1s. For example, when bits 0-7 are equal to 00000010, the grant is not for channels 0 and 2-3, but is for channel 1.

Using the extended discovery gate message 400, the extended gate message 600, the extended gate message 700, and the extended report message 900, the OLT 110 and the ONUs 120 may implement channel bonding. The OLT 110 assigns grants to the ONUs 120 in at least three different manners. In a first manner, the OLT 110 selects a channel, for instance channel 0, as a control channel and communicates control information such as the extended discovery gate message 400, the extended gate message 600, and the extended gate message 700 on channel 0. Thus, if the OLT 110 desires to assign grants to an ONU 120 for both channel 0 and channel 2, then the OLT 110 does so by transmitting the extended discovery gate message 400, the extended gate message 600, or the extended gate message 700 on channel 0.

In a second manner, the OLT 110 transmits the extended discovery gate message 400, the extended gate message 600, and the extended gate message 700 to the ONU 120 on all channels. Thus, the OLT 110 treats all channels equally and duplicates the extended discovery gate message 400, the extended gate message 600, and the extended gate message 700. In a third manner, the OLT 110 transmits the extended discovery gate message 400, the extended gate message 600, and the extended gate message 700 to the ONU 120 on the channel that the OLT 110 assigns the grants to.

Using the extended discovery gate message 400, the extended gate message 600, the extended gate message 700, and the extended report message 900, the OLT 110 and the ONUs 120 may implement power conservation in the ONUs 120. When traffic is light, an ONU 120 enters a power-saving mode. The ONU 120 periodically transmits the extended report message 900 to the OLT 110 on one channel, for instance channel 1, to indicate that the other channels, for instance channels 0 and 2-3, are in a power-saving mode. The ONU 120 sets a value of the channel assignment field 935 to 0000010 and sets values of the queue #1 report field 950, the queue #2 report field 955, the queue #3 report field 960, the queue #4 report field 965, the queue #5 report field 970, the queue #6 report field 975, and the queue #7 report field 980 to 0.

The OLT 110 may desire to disable transceivers or transmitters of the ONU 120, keep alive the ONU 120, or wake up the ONU 120. If the OLT 110 desires to disable transceivers or transmitters of the ONU 120, then the OLT 110 may do so using the extended discovery gate message 400, the extended gate message 600, or the extended gate message 700. The discovery gate message 400 may instruct the ONU 120 to disable all transceivers or transmitters except a transceiver or transmitter corresponding to a channel indicated in the channel assignment field 430. The extended gate message 600 may instruct the ONU 120 to disable all transceivers or transmitters except a transceiver or transmitter corresponding to a channel indicated in the channel assignment field 630. The extended gate message 700 may instruct the ONU 120 to disable all transceivers or transmitters except transceivers or transmitters corresponding to channels indicated in the channel assignment field #1 field 717, the channel assignment #2 field 725, the channel assignment #3 field 733, and the channel assignment #4 field 740.

If the OLT 110 desires to keep alive the ONU 120, then the OLT 110 periodically transmits to the ONU 120 the extended gate message 600, the extended gate message 700, or another suitable message with a first format. For instance, for the extended gate message 600, the OLT 110 sets a value of the channel assignment field 630 to all 1s and a value of the number of grants/flags field 635 to 0. For the extended gate message 700, the OLT 110 sets a value of the number of grants/flags field 715 to 0 and sets a value of the channel assignment #1 field 717, the channel assignment #2 field 725, the channel assignment #3 field 733, and the channel assignment #4 field 740 to all 1s.

If the OLT 110 desires to wake up the ONU 120, then the OLT 110 transmits to the ONU 120 the extended gate message 600, the extended gate message 700, or another suitable message with a second format. For instance, for the extended gate message 600, the OLT 110 sets a value of the channel assignment field 630 to 0000010 and a value of the number of grants/flags field 635 to 1. For the extended gate message 700, the OLT 110 sets a value of the number of grants/flags field 715 to 1 and sets a value of the channel assignment #1 field 717, the channel assignment #2 field 725, the channel assignment #3 field 733, and the channel assignment #4 field 740 to 0000010.

Figure 11:
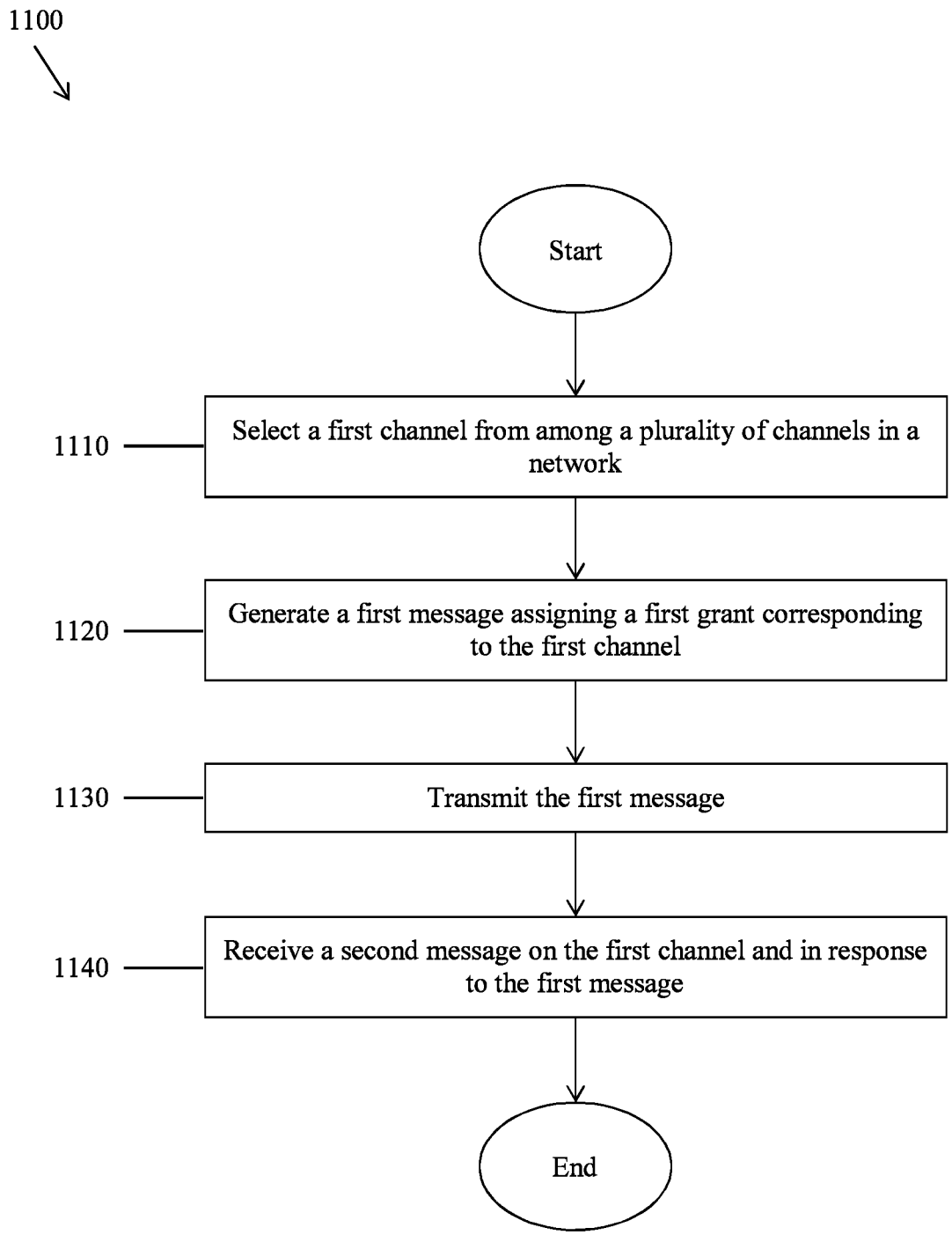
FIG. 11 is a flowchart illustrating a method of channel bonding in a multiple-wavelength PON according to an embodiment of the disclosure.

FIG. 11 is a flowchart illustrating a method 1100 of channel bonding in a multiple-wavelength PON according to an embodiment of the disclosure. The OLT 110 performs the method 1100. At step 1110, a first channel is selected from among a plurality of channels in a network. For instance, the OLT 110 selects channel 1 from among channels 0-3 in the PON 100. At step 1120, a first message assigning a first grant corresponding to a first channel is generated. For instance, the OLT 110 generates the extended discovery gate message 400, the extended gate message 600, or the extended gate message 700. At step 1130, the first message is transmitted. For instance, the OLT 110 transmits the extended discovery gate message 400, the extended gate message 600, or the extended gate message 700 to an ONU 120. Finally, at step 1140, a second message is received on the first channel and in response to the first message. For instance, the OLT 110 receives a second message from the ONU 120 on channel 1. The second message may be the extended report message 900.

Figure 12:
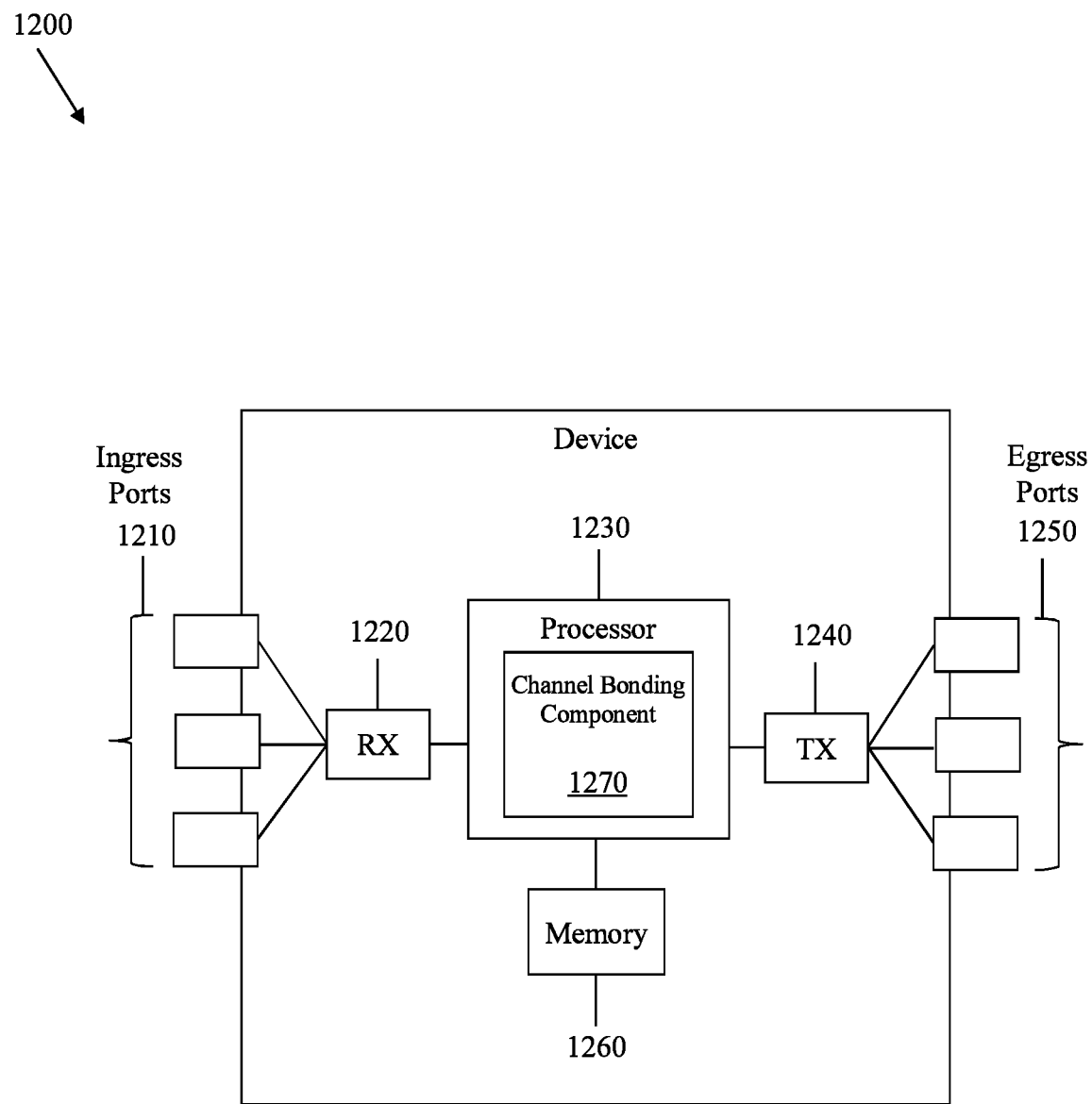
FIG. 12 is a schematic diagram of a device according to an embodiment of the disclosure.

FIG. 12 is a schematic diagram of a device 1200 according to an embodiment of the disclosure. The device 1200 may implement the disclosed embodiments. The device 1200 comprises ingress ports 1210 and an RX 1220 coupled to the ingress ports 1210 for receiving data; a processor, logic unit, or CPU 1230 coupled to the RX 1220 to process the data; a TX 1240 coupled to the processor 1230 and egress ports 1250 coupled to the TX 1240 for transmitting the data. A memory 1260 is coupled to the processor 1230 for storing the data. The device 1200 may also comprise OE components and EO components coupled to the ingress ports 1210, the RX 1220, the TX 1240, and the egress ports 1250 for ingress or egress of optical or electrical signals.

The processor 1230 is any suitable combination of hardware, middleware, firmware, or software. The processor 1230 comprises any combination of one or more CPU chips, cores, FPGAs, ASICs, or DSPs. The processor 1230 communicates with the ingress ports 1210, RX 1220, TX 1240, egress ports 1250, and memory 1260. The processor 1230 comprises a channel bonding component 1270, which implements the disclosed embodiments. The inclusion of the channel bonding component 1270 therefore provides a substantial improvement to the functionality of the device 1200 and effects a transformation of the device 1200 to a different state. Alternatively, the memory 1260 stores the channel bonding component 1270 as instructions, and the processor 1230 executes those instructions.

The memory 1260 comprises one or more disks, tape drives, or solid-state drives. The device 1200 may use the memory 1260 as an over-flow data storage device to store programs when the device 1200 selects those programs for execution and to store instructions and data that the device 1200 reads during execution of those programs. The memory 1260 may be volatile or non-volatile and may be any combination of ROM, RAM, TCAM, or SRAM.

In an example embodiment, an apparatus comprises: a processor element configured to: select a first channel from among a plurality of channels in a network, and generate a first message assigning a first grant corresponding to the first channel; a transmitter element coupled to the processor element and configured to transmit the first message; and a receiver element coupled to the processor element and configured to receive a second message on the first channel and in response to the first message.

A first component is directly coupled to a second component when there are no intervening components, except for a line, a trace, or another medium between the first component and the second component. The first component is indirectly coupled to the second component when there are intervening components other than a line, a trace, or another medium between the first component and the second component. The term "coupled" and its variants include both directly coupled and indirectly coupled. The use of the term "about" means a range including ±10% of the subsequent number unless otherwise stated.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, components, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. An optical line terminal (OLT) comprising:
a processor configured to generate a message comprising a channel assignment field, the message is used for discovery or for grant and the channel assignment field indicating at least one channel to be used by an optical network unit (ONU) for upstream transmission and, wherein the OLT is capable of providing multiple upstream channels; and
a transmitter coupled to the processor and configured to transmit the message to the ONU.

2. The OLT of claim 1, wherein the channel assignment field comprises a first field indicating whether a first upstream channel may be used for transmission.

3. The OLT of claim 1, wherein the message further comprises a start time field indicating a start time of the transmission.

4. The OLT of claim 2, wherein the channel assignment field comprises a second field indicating whether a second upstream channel may be used for transmission.

5. The OLT of claim 4, wherein the message comprises a Multi-Point Control Protocol (MPCP) message.

6. The OLT of claim 4, wherein a first field length of the first field is one bit and a second field length of the second field is one bit, wherein the first field is a binary 0 or 1 value and the second field is a binary 0 or 1 value, and wherein the binary 0 value indicates that the corresponding channel is not to be used for transmission and the binary 1 value indicates that the corresponding channel is to be used for transmission.

7. An optical network unit (ONU) comprising:
a receiver configured to receive a message comprising a channel assignment field, the message is used for discovery or for grant, the channel assignment field indicating at least one channel to be used by the ONU for upstream transmission, wherein the ONU is capable of providing multiple upstream channels; and
a processor coupled to the receiver and configured to process the message.

8. The ONU of claim 7, wherein the channel assignment field comprises a first field indicating whether a first upstream channel may be used for transmission.

9. The ONU of claim 8, wherein the channel assignment field comprises a second field indicating whether a second upstream channel may be used for transmission.

10. The ONU of claim 8, wherein a first field length of the first field is one bit and a second field length of the second field is one bit, wherein the first field is a binary 0 or 1 value and the second field is a binary 0 or 1 value, and wherein the binary 0 value indicates that the corresponding channel is not to be used for transmission and the binary 1 value indicates that the corresponding channel is to be used for transmission.

11. A method comprising, wherein the method is applied in a passive optical network (PON) system with multiple upstream channels:
generate a message comprising a channel assignment field, the message is used for discovery or for grant and the channel assignment field indicates at least one channel to be used by an optical network unit (ONU) for upstream transmission; and
transmit the message to the ONU.

12. The method of claim 11, wherein the channel assignment field comprises a first field indicating whether a first upstream channel may be used for transmission and a second field indicating whether a second upstream channel may be used for transmission.

13. The method of any one of claims 12, wherein a first field length of the first field is one bit and a second field length of the second field is one bit, wherein the first field is a binary 0 or 1 value and the second field is a binary 0 or 1 value, and wherein the binary 0 value indicates that the corresponding channel is not to be used for transmission and the binary 1 value indicates that the corresponding channel is to be used for transmission.

14. A method comprising, wherein the method is applied in an optical line terminal (OLT) a passive, wherein the OLT is capable of providing multiple upstream channels:
receive a message comprising a channel assignment field, the message is used for discovery or for grant, the channel assignment field indicating at least one channel to be used by an optical network unit (ONU) for upstream transmission; and
process the message.

15. The method of claim 14, wherein the channel assignment field comprises a first field indicating whether a first upstream channel may be used for transmission and a second field indicating whether a second upstream channel may be used for transmission.

16. The method of claim 15, wherein the message is an extension of a multi-point control protocol (MPCP) message.

17. The method of claim 16, wherein a first field length of the first field is one bit and a second field length of the second field is one bit, wherein the first field is a binary 0 or 1 value and the second field is a binary 0 or 1 value, and wherein the binary 0 value indicates that the corresponding channel is not to be used for transmission and the binary 0 value indicates that the corresponding channel is to be used for transmission.

18. An optical line terminal (OLT) comprising, wherein the OLT is capable of providing multiple upstream channels:
   a processor configured to generate a multipoint control protocol data unit (MPCPDU) comprising:
      a destination address field in a first position,
      a source address field in a second position,
      a length/type field in a third position and comprising a value of 0x8808,
      an operation code (opcode) field in a fourth position,
      a timestamp in a fifth position,
      a channel assignment field in a sixth position and comprising:
         a zeroth bit instructing an optical network unit (ONU) whether to use a zeroth wavelength channel for transmission,
         a first bit instructing the ONU whether to use a first wavelength channel for transmission, wherein the length of the channel assignment field is eight bits, and
      a frame check sequence (FCS) field in a last position; and
   a transmitter coupled to the processor and configured to transmit the MPCPDU to the ONU.

19. The OLT of claim 18, wherein the MPCPDU is a discovery gate MPCPDU.

20. The OLT of claim 18, wherein the MPCPDU is a gate MPCPDU.

21. An optical network unit (ONU) comprising, wherein the ONU is capable of providing multiple upstream channels:
   a receiver configured to receive from an optical line terminal (OLT) a multipoint control protocol data unit (MPCPDU) comprising:
      a destination address field in a first position,
      a source address field in a second position,
      a length/type field in a third position and comprising a value of 0x8808,
      an operation code (opcode) field in a fourth position,
      a timestamp in a fifth position,
      a channel assignment field in a sixth position and comprising:
         a zeroth bit instructing the ONU whether to use a zeroth wavelength channel for transmission,
         a first bit instructing the ONU whether to use a first wavelength channel for transmission, wherein the length of the channel assignment field is eight bits, and
      a frame check sequence (FCS) field in a last position; and
   a processor coupled to the receiver and configured to process the gate MPCPDU.

22. The ONU of claim 21, wherein the MPCPDU is a discovery gate MPCPDU.

23. The ONU of claim 21, wherein the MPCPDU is a gate MPCPDU.

* * * * *